(12) United States Patent
Lee

(10) Patent No.: US 11,816,197 B2
(45) Date of Patent: Nov. 14, 2023

(54) METHOD OF AUTHENTICATING USER AND APPARATUS THEREOF

(71) Applicant: LG ELECTRONICS INC., Seoul (KR)

(72) Inventor: Jaeho Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 471 days.

(21) Appl. No.: 17/104,602

(22) Filed: Nov. 25, 2020

(65) Prior Publication Data

US 2021/0209207 A1   Jul. 8, 2021

(30) Foreign Application Priority Data

Jan. 3, 2020   (KR) ................. 10-2020-0000950

(51) Int. Cl.
| | |
|---|---|
| *H04L 9/00* | (2022.01) |
| *H04L 9/32* | (2006.01) |
| *G06F 21/32* | (2013.01) |
| *H04W 12/06* | (2021.01) |
| *H04W 72/23* | (2023.01) |
| *G06N 3/02* | (2006.01) |
| *G06V 40/16* | (2022.01) |

(52) U.S. Cl.
CPC ............ *G06F 21/32* (2013.01); *H04W 12/06* (2013.01); *H04W 72/23* (2023.01); *G06N 3/02* (2013.01); *G06V 40/173* (2022.01)

(58) Field of Classification Search
CPC ........ G06F 21/32; H04W 72/23; H04W 12/06
USPC .......................................... 713/186
See application file for complete search history.

(56) References Cited

U.S. PATENT DOCUMENTS

| | | | | |
|---|---|---|---|---|
| 6,937,770 | B1* | 8/2005 | Oguz | H04N 19/132 375/E7.176 |
| 7,072,874 | B1* | 7/2006 | Decker | G06F 18/28 706/25 |
| 2006/0052690 | A1* | 3/2006 | Sirohey | A61B 6/481 600/420 |
| 2018/0199025 | A1* | 7/2018 | Holzer | B64C 39/024 |

(Continued)

FOREIGN PATENT DOCUMENTS

| | | | |
|---|---|---|---|
| CN | 107844748 A | * | 3/2018 |
| CN | 110378916 A | * | 10/2019 |
| CN | 110532845 A | * | 12/2019 |

(Continued)

*Primary Examiner* — Haresh N Patel
(74) *Attorney, Agent, or Firm* — Birch, Stewart, Kolasch & Birch, LLP

(57) ABSTRACT

Disclosed is user authentication. A user authentication method includes receiving a plurality of images including at least one object, extracting biological information from the plurality of images, performing user authentication based on a difference between the extracted biological information and biological information of a user stored in a memory, and updating a parameter of a learning model for the user authentication when a result of the execution of the user authentication satisfies a preset condition. The mobile terminal and the AI system of the present disclosure may be associated with an artificial intelligence module, a drone (or unmanned aerial vehicle (UAV)), a robot, an augmented reality (AR) device, a virtual reality (VR) device, a device related to 5G service, etc.

13 Claims, 13 Drawing Sheets

(56) References Cited

U.S. PATENT DOCUMENTS

2018/0219025 A1\* 8/2018 Takahashi ............. H01L 27/124
2018/0255290 A1\* 9/2018 Holzer ................. H04N 13/275

FOREIGN PATENT DOCUMENTS

| EP | 3511861 A1 | \* | 7/2019 |
| EP | 3862895 A1 | \* | 8/2021 |
| KR | 20190099157 A | \* | 8/2019 |
| WO | WO-2020053887 A1 | \* | 3/2020 |

\* cited by examiner

METHOD OF AUTHENTICATING USER AND APPARATUS THEREOF

This application is based on and claims priority under 35 U.S.C. 119 to Korean Patent Application No. 10-2020-0000950 filed on Jan. 3, 2020, which is incorporated herein by reference for all purposes as if fully set forth herein

BACKGROUND OF THE INVENTION

Field of the Invention

The present disclosure relates to user authentication.

Related Art

Recently, an electronic device that requires secure personal information is basically equipped with a user authentication algorithm for the protection of personal information of a user. For example, a biometrics algorithm using biological information, such as face recognition, fingerprint recognition, or iris recognition, is commonly applied to the user authentication algorithm.

A recognition ratio of face recognition may be degraded depending on whether a registered user is one of twins or a lookalike, or depending on the aging of the registered user.

SUMMARY OF THE INVENTION

The present disclosure is directed to solving the aforementioned need and/or problem.

Furthermore, the present disclosure is directed to implementing a user authentication method capable of improving performance for distinguishing between similar persons.

Furthermore, the present disclosure is directed to implementing user authentication capable of updating a parameter of a learning model for user authentication adaptive to biological information of a user who is changed over aging.

Furthermore, the present disclosure is directed to implementing a user authentication method capable of inferring the same user authentication results with respect to all of various appearances of the same person.

In an aspect, a user authentication method includes receiving a plurality of images including at least one object, extracting biological information from the plurality of images, performing user authentication based on a difference between the extracted biological information and biological information of a user stored in a memory, and updating a parameter of a learning model for the user authentication when a result of the execution of the user authentication satisfies a preset condition.

Furthermore, receiving the plurality of images may include receiving the plurality of images from an external terminal over a network.

Furthermore, receiving the plurality of images may include receiving an image obtained through a camera or an image stored in the memory.

Furthermore, the biological information may include feature information of a face or an embedding vector generated from the feature information. The feature information may include a specific part of the face, including a location of an eye, an eyebrow location, an eyebrow shape, lips, a jawline, a philtrum, mustache and/or beard, a mole, or a scar.

Furthermore, performing the user authentication may include determining, as an identical person, the object included in the image when a vector distance between the extracted biological information and the biological information of the user is a reference value or less.

Furthermore, the preset condition may include a first condition in which a selection input for any one of two or more objects is received if the two or more objects authenticated as the user are present within one image. Updating the parameter of the learning model may include adjusting a weight or bias of the learning model so that reliability related to the object for which the selection input is received indicates a higher value, when the first condition is satisfied.

Furthermore, the preset condition may include a second condition in which two or more images including the object authenticated as the user are present and generation times of the two or more images are different. Updating the parameter of the learning model may include adjusting a weight or bias of the learning model so that reliability related to an object included in an image most recently generated among the two or more images indicates a higher value, when the second condition is satisfied.

Furthermore, the preset condition may include a third condition in which an image captured through a front camera does not include an object authenticated as the user. Updating the parameter of the learning model may include adjusting a weight or bias of the learning model so that reliability related to an object included in the image not including the object authenticated as the user indicates a higher value, when the third condition is satisfied.

Furthermore, the learning model may be a neural network model based on a graphic convolution network (GCN).

Furthermore, the user authentication method may further include receiving, from a network, DCI used to schedule a transmission of the plurality of images, and transmitting the plurality of images to the network based on the DCI.

Furthermore, the user authentication method may further include performing an initial access procedure with the network based on an SSB, and transmitting a screenshot image to the network through a PUSCH. The DM-RSs of the SSB and the PUSCH are QCLed with respect to a QCL type D.

Furthermore, the user authentication method may further include controlling a transceiver to transmit the plurality of images to an AI processor or an AI system included in the network, and controlling the transceiver to receive AI-processed information from the AI processor or the AI system. The AI-processed information may include an updated parameter of the learning model for the user authentication.

In another aspect, a mobile terminal includes a memory storing registered user information and a plurality of images and a processor configured to extract biological information from the plurality of images, perform user authentication based on a difference between the extracted biological information and biological information of a user stored in a memory, and update a parameter of a learning model for the user authentication when a result of the execution of the user authentication satisfies a preset condition.

BRIEF DESCRIPTION OF THE DRAWINGS

The attached drawings, which are included as part of a detailed description to help you understand this statement, provide an example of implementation for this statement and explain the technical features of this statement with a detailed description.

DESCRIPTION OF EXEMPLARY EMBODIMENTS

Hereinafter, embodiments of the disclosure will be described in detail with reference to the attached drawings. The same or similar components are given the same reference numbers and redundant description thereof is omitted. The suffixes "module" and "unit" of elements herein are used for convenience of description and thus can be used interchangeably and do not have any distinguishable meanings or functions. Further, in the following description, if a detailed description of known techniques associated with the present invention would unnecessarily obscure the gist of the present invention, detailed description thereof will be omitted. In addition, the attached drawings are provided for easy understanding of embodiments of the disclosure and do not limit technical spirits of the disclosure, and the embodiments should be construed as including all modifications, equivalents, and alternatives falling within the spirit and scope of the embodiments.

While terms, such as "first", "second", etc., may be used to describe various components, such components must not be limited by the above terms. The above terms are used only to distinguish one component from another.

When an element is "coupled" or "connected" to another element, it should be understood that a third element may be present between the two elements although the element may be directly coupled or connected to the other element. When an element is "directly coupled" or "directly connected" to another element, it should be understood that no element is present between the two elements.

The singular forms are intended to include the plural forms as well, unless the context clearly indicates otherwise.

In addition, in the specification, it will be further understood that the terms "comprise" and "include" specify the presence of stated features, integers, steps, operations, elements, components, and/or combinations thereof, but do not preclude the presence or addition of one or more other features, integers, steps, operations, elements, components, and/or combinations.

A. Example of Block Diagram of UE and 5G Network

Figure 1:
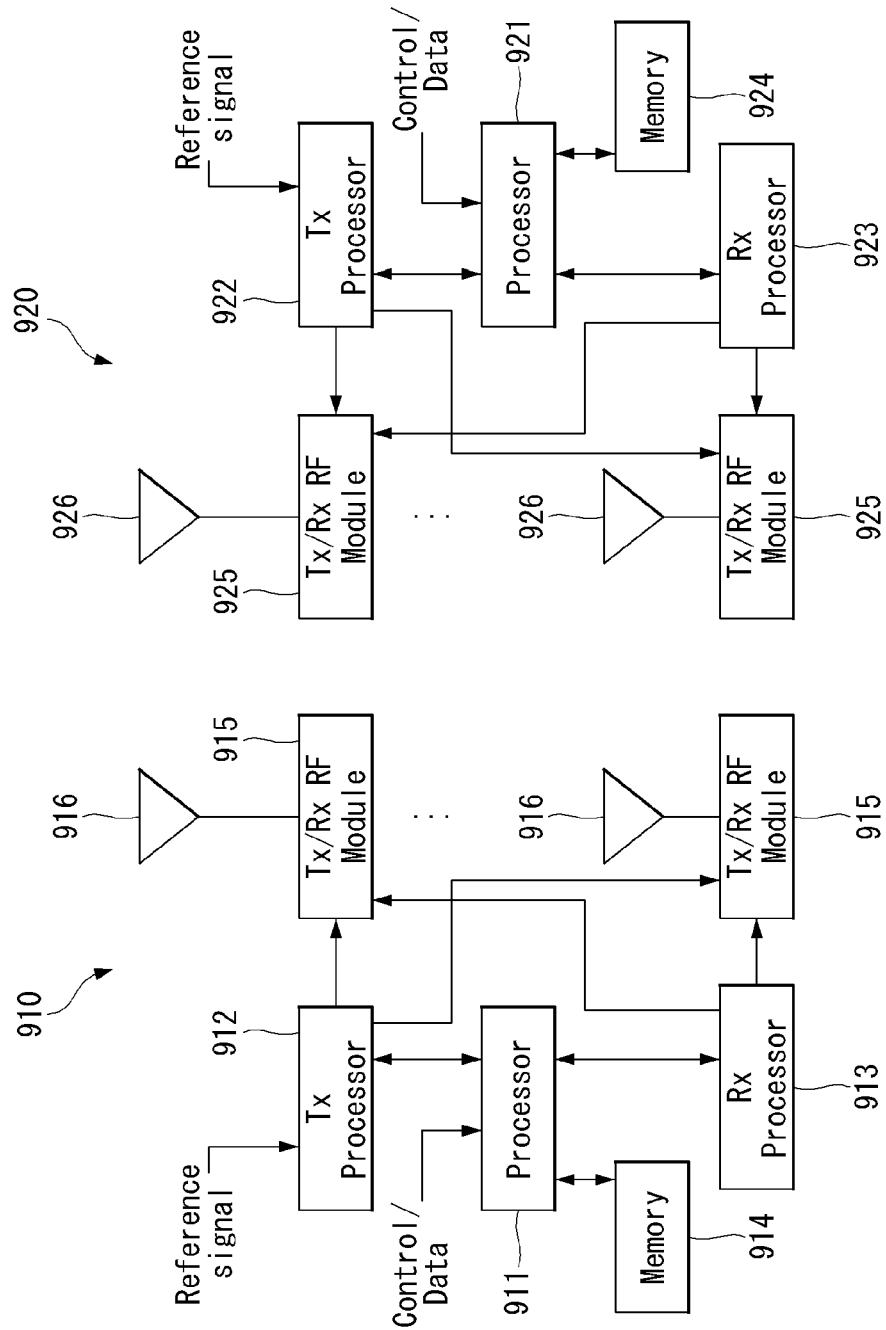
FIG. 1 shows an example of a block diagram of a wireless communication system to which methods proposed in the present specification is applicable.

FIG. 1 is a block diagram of a wireless communication system to which methods proposed in the disclosure are applicable.

Referring to FIG. 1, a device (AI device) including an AI module is defined as a first communication device (910 of FIG. 1), and a processor 911 can perform detailed AI operation.

A 5G network including another device (AI server) communicating with the AI device is defined as a second communication device (920 of FIG. 1), and a processor 921 can perform detailed AI operations.

The 5G network may be represented as the first communication device and the AI device may be represented as the second communication device.

For example, the first communication device or the second communication device may be a base station, a network node, a transmission terminal, a reception terminal, a wireless device, a wireless communication device, vehicles, vehicles equipped with self-driving features, connected cars, drones, AI (Unmanned Aerial Vehicle, UAV), robots, Aged Reality (AR) devices, VR (Virtual Reality) devices, MED REALity devices, public safety devices, public TCs, MTC devices, IoT devices, medical devices, FinTech devices (or financial devices), security devices, climate/environmental devices, 5G services, or other devices related to the fourth industrial revolution, or like.

For example, a terminal or user equipment (UE) may include a cellular phone, a smart phone, a laptop computer, a digital broadcast terminal, personal digital assistants (PDAs), a portable multimedia player (PMP), a navigation device, a slate PC, a tablet PC, an ultrabook, a wearable device (e.g., a smartwatch, a smart glass and a head mounted display (HMD)), etc. For example, the HMD may be a display device worn on the head of a user. For example, the HMD may be used to realize VR, AR or MR. For example, the drone may be a flying object that flies by wireless control signals without a person therein. For example, the VR device may include a device that implements objects or backgrounds of a virtual world. For example, the AR device may include a device that connects and implements objects or background of a virtual world to objects, backgrounds, or the like of a real world. For example, the MR device may include a device that unites and implements objects or background of a virtual world to objects, backgrounds, or the like of a real world. For example, the hologram device may include a device that implements 360-degree 3D images by recording and playing 3D information using the interference phenomenon of light that is generated by two lasers meeting each other which is called holography. For example, the public safety device may include an image repeater or an imaging device that can be worn on the body of a user. For example, the MTC device and the IoT device may be devices that do not require direct interference or operation by a person. For example, the MTC device and the IoT device may include a smart meter, a bending machine, a thermometer, a smart bulb, a door lock, various sensors, or the like. For example, the medical device may be a device that is used to diagnose, treat, attenuate, remove, or prevent diseases. For example, the medical device may be a device that is used to diagnose, treat, attenuate, or correct injuries or disorders. For example, the medial device may be a device that is used to examine, replace, or change structures or functions. For example, the medical device may be a device that is used to control pregnancy. For example, the medical device may include a device for medical treatment, a device for operations, a device for (external) diagnose, a hearing aid, an operation device, or the like. For example, the security device may be a device that is installed to prevent a danger that is likely to occur and to keep safety. For example, the security device may be a camera, a CCTV, a recorder, a black box, or the like. For example, the Fin Tech device may be a device that can provide financial services such as mobile payment.

Referring to FIG. 1, the first communication device 910 and the second communication device 920 include processors 911 and 921, memories 914 and 924, one or more Tx/Rx radio frequency (RF) modules 915 and 925, Tx processors 912 and 922, Rx processors 913 and 923, and antennas 916 and 926. The Tx/Rx module is also referred to as a transceiver. Each Tx/Rx module 915 transmits a signal through each antenna 926. The processor implements the aforementioned functions, processes and/or methods. The processor 921 may be related to the memory 924 that stores program code and data. The memory may be referred to as a computer-readable medium. More specifically, the Tx processor 912 implements various signal processing functions with respect to L1 (i.e., physical layer) in DL (communication from the first communication device to the second communication device). The Rx processor implements various signal processing functions of L1 (i.e., physical layer).

UL (communication from the second communication device to the first communication device) is processed in the first communication device 910 in a way similar to that described in association with a receiver function in the second communication device 920. Each Tx/Rx module 925 receives a signal through each antenna 926. Each Tx/Rx module provides RF carriers and information to the Rx processor 923. The processor 921 may be related to the memory 924 that stores program code and data. The memory may be referred to as a computer-readable medium.

B. Signal Transmission/Reception Method in Wireless Communication

Figure 2:
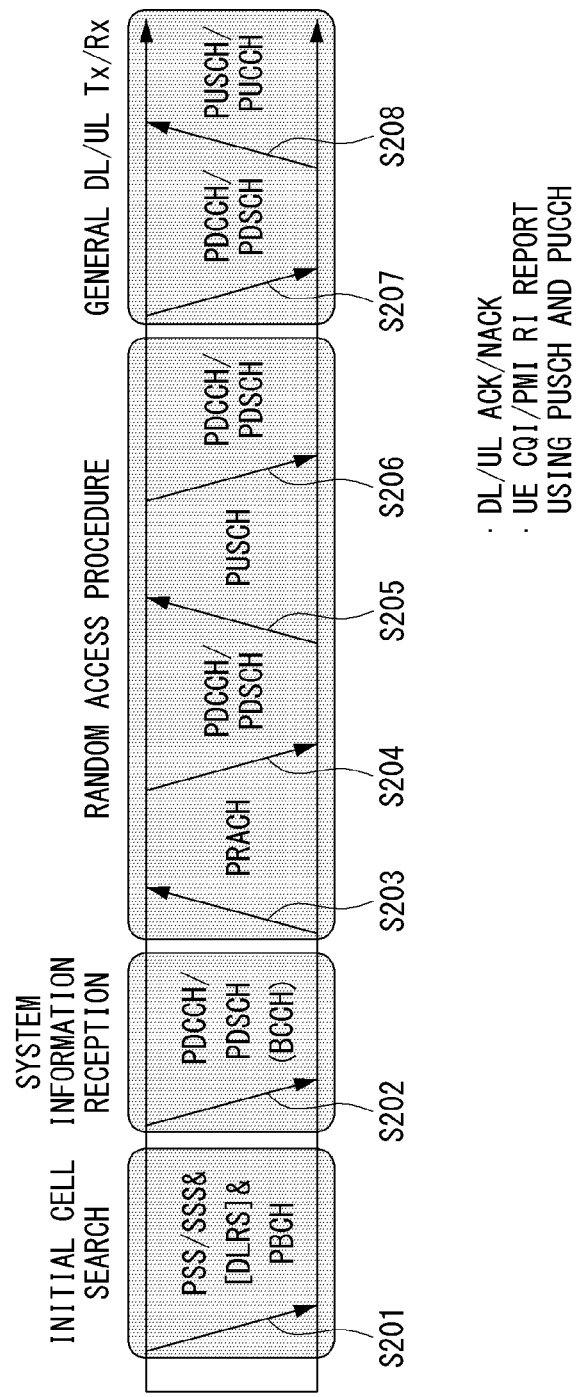
FIG. 2 is a diagram showing an example of a signal transmitting/receiving method in a wireless communication system.

FIG. 2 is a diagram showing an example of a signal transmission/reception method in a wireless communication system.

Referring to FIG. 2, when a UE is powered on or enters a new cell, the UE performs an initial cell search operation such as synchronization with a BS (S201). For this operation, the UE can receive a primary synchronization channel (P-SCH) and a secondary synchronization channel (S-SCH) from the BS to synchronize with the BS and obtain information such as a cell ID. In LTE and NR systems, the P-SCH and S-SCH are respectively called a primary synchronization signal (PSS) and a secondary synchronization signal (SSS). After initial cell search, the UE can obtain broadcast information in the cell by receiving a physical broadcast channel (PBCH) from the BS. Further, the UE can receive a downlink reference signal (DL RS) in the initial cell search step to check a downlink channel state. After initial cell search, the UE can obtain more detailed system information by receiving a physical downlink shared channel (PDSCH) according to a physical downlink control channel (PDCCH) and information included in the PDCCH (S202).

Meanwhile, when the UE initially accesses the BS or has no radio resource for signal transmission, the UE can perform a random access procedure (RACH) for the BS (steps S203 to S206). To this end, the UE can transmit a specific sequence as a preamble through a physical random access channel (PRACH) (S203 and S205) and receive a random access response (RAR) message for the preamble through a PDCCH and a corresponding PDSCH (S204 and S206). In the case of a contention-based RACH, a contention resolution procedure may be additionally performed.

After the UE performs the above-described process, the UE can perform PDCCH/PDSCH reception (S207) and physical uplink shared channel (PUSCH)/physical uplink control channel (PUCCH) transmission (S208) as normal uplink/downlink signal transmission processes. Particularly, the UE receives downlink control information (DCI) through the PDCCH. The UE monitors a set of PDCCH candidates in monitoring occasions set for one or more control element sets (CORESET) on a serving cell according to corresponding search space configurations. A set of PDCCH candidates to be monitored by the UE is defined in terms of search space sets, and a search space set may be a common search space set or a UE-specific search space set. CORESET includes a set of (physical) resource blocks having a duration of one to three OFDM symbols. A network can configure the UE such that the UE has a plurality of CORESETs. The UE monitors PDCCH candidates in one or more search space sets. Here, monitoring means attempting decoding of PDCCH candidate(s) in a search space. When the UE has successfully decoded one of PDCCH candidates in a search space, the UE determines that a PDCCH has been detected from the PDCCH candidate and performs PDSCH reception or PUSCH transmission on the basis of DCI in the detected PDCCH. The PDCCH can be used to schedule DL transmissions over a PDSCH and UL transmissions over a PUSCH. Here, the DCI in the PDCCH includes downlink assignment (i.e., downlink grant (DL grant)) related to a physical downlink shared channel and including at least a modulation and coding format and resource allocation information, or an uplink grant (UL grant) related to a physical uplink shared channel and including a modulation and coding format and resource allocation information.

An initial access (IA) procedure in a 5G communication system will be additionally described with reference to FIG. 2.

The UE can perform cell search, system information acquisition, beam alignment for initial access, and DL measurement on the basis of an SSB. The SSB is interchangeably used with a synchronization signal/physical broadcast channel (SS/PBCH) block.

The SSB includes a PSS, an SSS and a PBCH. The SSB is configured in four consecutive OFDM symbols, and a PSS, a PBCH, an SSS/PBCH or a PBCH is transmitted for each OFDM symbol. Each of the PSS and the SSS includes one OFDM symbol and 127 subcarriers, and the PBCH includes 3 OFDM symbols and 576 subcarriers.

Cell search refers to a process in which a UE obtains time/frequency synchronization of a cell and detects a cell identifier (ID) (e.g., physical layer cell ID (PCI)) of the cell. The PSS is used to detect a cell ID in a cell ID group and the SSS is used to detect a cell ID group. The PBCH is used to detect an SSB (time) index and a half-frame.

There are 336 cell ID groups and there are 3 cell IDs per cell ID group. A total of 1008 cell IDs are present. Information on a cell ID group to which a cell ID of a cell belongs is provided/obtained through an SSS of the cell, and information on the cell ID among 336 cell ID groups is provided/obtained through a PSS.

The SSB is periodically transmitted in accordance with SSB periodicity. A default SSB periodicity assumed by a UE during initial cell search is defined as 20 ms. After cell access, the SSB periodicity can be set to one of {5 ms, 10 ms, 20 ms, 40 ms, 80 ms, 160 ms} by a network (e.g., a BS).

Next, acquisition of system information (SI) will be described.

SI is divided into a master information block (MIB) and a plurality of system information blocks (SIBs). SI other than the MIB may be referred to as remaining minimum system information. The MIB includes information/parameter for monitoring a PDCCH that schedules a PDSCH carrying SIB1 (SystemInformationBlock1) and is transmitted by a BS through a PBCH of an SSB. SIB1 includes information related to availability and scheduling (e.g., transmission periodicity and SI-window size) of the remaining SIBs (hereinafter, SIBx, x is an integer equal to or greater than 2). SiBx is included in an SI message and transmitted over a PDSCH. Each SI message is transmitted within a periodically generated time window (i.e., SI-window).

A random access (RA) procedure in a 5G communication system will be additionally described with reference to FIG. 2.

A random access procedure is used for various purposes. For example, the random access procedure can be used for network initial access, handover, and UE-triggered UL data transmission. A UE can obtain UL synchronization and UL transmission resources through the random access procedure. The random access procedure is classified into a contention-based random access procedure and a contention-free random access procedure. A detailed procedure for the contention-based random access procedure is as follows.

A UE can transmit a random access preamble through a PRACH as Msg1 of a random access procedure in UL. Random access preamble sequences having different two lengths are supported. A long sequence length 839 is applied to subcarrier spacings of 1.25 kHz and 5 kHz and a short sequence length 139 is applied to subcarrier spacings of 15 kHz, 30 kHz, 60 kHz and 120 kHz.

When a BS receives the random access preamble from the UE, the BS transmits a random access response (RAR) message (Msg2) to the UE. A PDCCH that schedules a PDSCH carrying a RAR is CRC masked by a random access (RA) radio network temporary identifier (RNTI) (RA-RNTI) and transmitted. Upon detection of the PDCCH masked by the RA-RNTI, the UE can receive a RAR from the PDSCH scheduled by DCI carried by the PDCCH. The UE checks whether the RAR includes random access response information with respect to the preamble transmitted by the UE, that is, Msg1. Presence or absence of random access information with respect to Msg1 transmitted by the UE can be determined according to presence or absence of a random access preamble ID with respect to the preamble transmitted by the UE. If there is no response to Msg1, the UE can retransmit the RACH preamble less than a predetermined number of times while performing power ramping. The UE calculates PRACH transmission power for preamble retransmission on the basis of most recent pathloss and a power ramping counter.

The UE can perform UL transmission through Msg3 of the random access procedure over a physical uplink shared channel on the basis of the random access response information. Msg3 can include an RRC connection request and a UE ID. The network can transmit Msg4 as a response to Msg3, and Msg4 can be handled as a contention resolution message on DL. The UE can enter an RRC connected state by receiving Msg4.

C. Beam Management (BM) Procedure of 5G Communication System

A BM procedure can be divided into (1) a DL MB procedure using an SSB or a CSI-RS and (2) a UL BM procedure using a sounding reference signal (SRS). In addition, each BM procedure can include Tx beam swiping for determining a Tx beam and Rx beam swiping for determining an Rx beam.

The DL BM procedure using an SSB will be described.

Configuration of a beam report using an SSB is performed when channel state information (CSI)/beam is configured in RRC_CONNECTED.

A UE receives a CSI-ResourceConfig IE including CSI-SSB-ResourceSetList for SSB resources used for BM from a BS. The RRC parameter "csi-SSB-ResourceSetList" represents a list of SSB resources used for beam management and report in one resource set. Here, an SSB resource set can be set as {SSBx1, SSBx2, SSBx3, SSBx4, . . . }. An SSB index can be defined in the range of 0 to 63.

The UE receives the signals on SSB resources from the BS on the basis of the CSI-SSB-ResourceSetList.

When CSI-RS reportConfig with respect to a report on SSBRI and reference signal received power (RSRP) is set, the UE reports the best SSBRI and RSRP corresponding thereto to the BS. For example, when reportQuantity of the CSI-RS reportConfig IE is set to 'ssb-Index-RSRP', the UE reports the best SSBRI and RSRP corresponding thereto to the BS.

When a CSI-RS resource is configured in the same OFDM symbols as an SSB and 'QCL-TypeD' is applicable, the UE can assume that the CSI-RS and the SSB are quasi co-located (QCL) from the viewpoint of 'QCL-TypeD'. Here, QCL-TypeD may mean that antenna ports are quasi co-located from the viewpoint of a spatial Rx parameter. When the UE receives signals of a plurality of DL antenna ports in a QCL-TypeD relationship, the same Rx beam can be applied.

Next, a DL BM procedure using a CSI-RS will be described.

An Rx beam determination (or refinement) procedure of a UE and a Tx beam swiping procedure of a BS using a CSI-RS will be sequentially described. A repetition parameter is set to 'ON' in the Rx beam determination procedure of a UE and set to 'OFF' in the Tx beam swiping procedure of a BS.

First, the Rx beam determination procedure of a UE will be described.

The UE receives an NZP CSI-RS resource set IE including an RRC parameter with respect to 'repetition' from a BS through RRC signaling. Here, the RRC parameter 'repetition' is set to 'ON'.

The UE repeatedly receives signals on resources in a CSI-RS resource set in which the RRC parameter 'repetition' is set to 'ON' in different OFDM symbols through the same Tx beam (or DL spatial domain transmission filters) of the BS.

The UE determines an RX beam thereof

The UE skips a CSI report. That is, the UE can skip a CSI report when the RRC parameter 'repetition' is set to 'ON'.

Next, the Tx beam determination procedure of a BS will be described.

A UE receives an NZP CSI-RS resource set IE including an RRC parameter with respect to 'repetition' from the BS through RRC signaling. Here, the RRC parameter 'repetition' is related to the Tx beam swiping procedure of the BS when set to 'OFF'.

The UE receives signals on resources in a CSI-RS resource set in which the RRC parameter 'repetition' is set to 'OFF' in different DL spatial domain transmission filters of the BS.

The UE selects (or determines) a best beam.

The UE reports an ID (e.g., CRI) of the selected beam and related quality information (e.g., RSRP) to the BS. That is, when a CSI-RS is transmitted for BM, the UE reports a CRI and RSRP with respect thereto to the BS.

Next, the UL BM procedure using an SRS will be described.

A UE receives RRC signaling (e.g., SRS-Config IE) including a (RRC parameter) purpose parameter set to "beam management" from a BS. The SRS-Config IE is used to set SRS transmission. The SRS-Config IE includes a list of SRS-Resources and a list of SRS-ResourceSets. Each SRS resource set refers to a set of SRS-resources.

The UE determines Tx beamforming for SRS resources to be transmitted on the basis of SRS-SpatialRelation Info included in the SRS-Config IE. Here, SRS-SpatialRelation Info is set for each SRS resource and indicates whether the same beamforming as that used for an SSB, a CSI-RS or an SRS will be applied for each SRS resource.

When SRS-SpatialRelationInfo is set for SRS resources, the same beamforming as that used for the SSB, CSI-RS or SRS is applied. However, when SRS-SpatialRelationInfo is not set for SRS resources, the UE arbitrarily determines Tx beamforming and transmits an SRS through the determined Tx beamforming.

Next, a beam failure recovery (BFR) procedure will be described.

In a beamformed system, radio link failure (RLF) may frequently occur due to rotation, movement or beamforming blockage of a UE. Accordingly, NR supports BFR in order to prevent frequent occurrence of RLF. BFR is similar to a radio link failure recovery procedure and can be supported when a UE knows new candidate beams. For beam failure detection, a BS configures beam failure detection reference signals for a UE, and the UE declares beam failure when the number of beam failure indications from the physical layer of the UE reaches a threshold set through RRC signaling within a period set through RRC signaling of the BS. After beam failure detection, the UE triggers beam failure recovery by initiating a random access procedure in a PCell and performs beam failure recovery by selecting a suitable beam. (When the BS provides dedicated random access resources for certain beams, these are prioritized by the UE). Completion of the aforementioned random access procedure is regarded as completion of beam failure recovery.

D. URLLC (Ultra-Reliable and Low Latency Communication)

URLLC transmission defined in NR can refer to (1) a relatively low traffic size, (2) a relatively low arrival rate, (3) extremely low latency requirements (e.g., 0.5 and 1 ms), (4) relatively short transmission duration (e.g., 2 OFDM symbols), (5) urgent services/messages, etc. In the case of UL, transmission of traffic of a specific type (e.g., URLLC) needs to be multiplexed with another transmission (e.g., eMBB) scheduled in advance in order to satisfy more stringent latency requirements. In this regard, a method of providing information indicating preemption of specific resources to a UE scheduled in advance and allowing a URLLC UE to use the resources for UL transmission is provided.

NR supports dynamic resource sharing between eMBB and URLLC. eMBB and URLLC services can be scheduled on non-overlapping time/frequency resources, and URLLC transmission can occur in resources scheduled for ongoing eMBB traffic. An eMBB UE may not ascertain whether PDSCH transmission of the corresponding UE has been partially punctured and the UE may not decode a PDSCH due to corrupted coded bits. In view of this, NR provides a preemption indication. The preemption indication may also be referred to as an interrupted transmission indication.

With regard to the preemption indication, a UE receives DownlinkPreemption IE through RRC signaling from a BS. When the UE is provided with DownlinkPreemption IE, the UE is configured with INT-RNTI provided by a parameter int-RNTI in DownlinkPreemption IE for monitoring of a PDCCH that conveys DCI format 2_1. The UE is additionally configured with a corresponding set of positions for fields in DCI format 2_1 according to a set of serving cells and positionInDCI by INT-ConfigurationPerServing Cell including a set of serving cell indexes provided by servingCellID, configured having an information payload size for DCI format 2_1 according to dci-Payloadsize, and configured with indication granularity of time-frequency resources according to timeFrequency Sect.

The UE receives DCI format 2_1 from the BS on the basis of the DownlinkPreemption IE.

When the UE detects DCI format 2_1 for a serving cell in a configured set of serving cells, the UE can assume that there is no transmission to the UE in PRBs and symbols indicated by the DCI format 2_1 in a set of PRBs and a set of symbols in a last monitoring period before a monitoring period to which the DCI format 2_1 belongs. For example, the UE assumes that a signal in a time-frequency resource indicated according to preemption is not DL transmission scheduled therefor and decodes data on the basis of signals received in the remaining resource region.

E. mMTC (Massive MTC)

mMTC (massive Machine Type Communication) is one of 5G scenarios for supporting a hyper-connection service providing simultaneous communication with a large number of UEs. In this environment, a UE intermittently performs communication with a very low speed and mobility. Accordingly, a main goal of mMTC is operating a UE for a long time at a low cost. With respect to mMTC, 3GPP deals with MTC and NB (NarrowBand)-IoT.

mMTC has features such as repetitive transmission of a PDCCH, a PUCCH, a PDSCH (physical downlink shared channel), a PUSCH, etc., frequency hopping, retuning, and a guard period.

That is, a PUSCH (or a PUCCH (particularly, a long PUCCH) or a PRACH) including specific information and a PDSCH (or a PDCCH) including a response to the specific information are repeatedly transmitted. Repetitive transmission is performed through frequency hopping, and for repetitive transmission, (RF) retuning from a first frequency resource to a second frequency resource is performed in a guard period and the specific information and the response to the specific information can be transmitted/received through a narrowband (e.g., 6 resource blocks (RBs) or 1 RB).

F. Basic Operation of AI Processing Using 5G Communication

Figure 3:
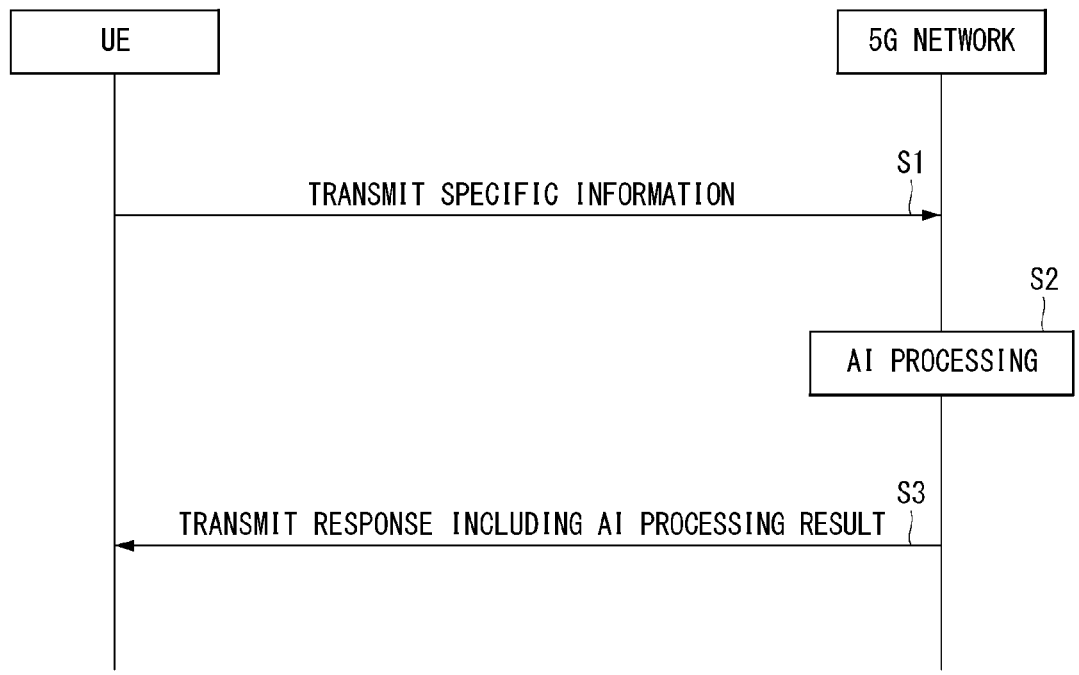
FIG. 3 shows an example of a user terminal and a 5G network in a 5G communication system.

FIG. 3 shows an example of basic operations of AI processing in a 5G communication system.

The UE transmits specific information to the 5G network (S1). The 5G network may perform 5G processing related to the specific information (S2). Here, the 5G processing may include AI processing. And the 5G network may transmit response including AI processing result to UE (S3).

G. Applied Operations between UE and 5G Network in 5G Communication System

Hereinafter, the operation of an autonomous vehicle using 5G communication will be described in more detail with reference to wireless communication technology (BM procedure, URLLC, mMTC, etc.) described in FIGS. 1 and 2.

First, a basic procedure of an applied operation to which a method proposed by the present invention which will be described later and eMBB of 5G communication are applied will be described.

As in steps S1 and S3 of FIG. 3, the autonomous vehicle performs an initial access procedure and a random access procedure with the 5G network prior to step S1 of FIG. 3 in order to transmit/receive signals, information and the like to/from the 5G network.

More specifically, the autonomous vehicle performs an initial access procedure with the 5G network on the basis of an SSB in order to obtain DL synchronization and system information. A beam management (BM) procedure and a beam failure recovery procedure may be added in the initial access procedure, and quasi-co-location (QCL) relation may be added in a process in which the autonomous vehicle receives a signal from the 5G network.

In addition, the autonomous vehicle performs a random access procedure with the 5G network for UL synchronization acquisition and/or UL transmission. The 5G network can transmit, to the autonomous vehicle, a UL grant for scheduling transmission of specific information. Accordingly, the autonomous vehicle transmits the specific information to the 5G network on the basis of the UL grant. In addition, the 5G network transmits, to the autonomous vehicle, a DL grant for scheduling transmission of 5G processing results with respect to the specific information. Accordingly, the 5G network can transmit, to the autonomous vehicle, information (or a signal) related to remote control on the basis of the DL grant.

Next, a basic procedure of an applied operation to which a method proposed by the present invention which will be described later and URLLC of 5G communication are applied will be described.

As described above, an autonomous vehicle can receive DownlinkPreemption IE from the 5G network after the autonomous vehicle performs an initial access procedure and/or a random access procedure with the 5G network. Then, the autonomous vehicle receives DCI format 2_1 including a preemption indication from the 5G network on the basis of DownlinkPreemption IE. The autonomous vehicle does not perform (or expect or assume) reception of eMBB data in resources (PRBs and/or OFDM symbols) indicated by the preemption indication. Thereafter, when the autonomous vehicle needs to transmit specific information, the autonomous vehicle can receive a UL grant from the 5G network.

Next, a basic procedure of an applied operation to which a method proposed by the present invention which will be described later and mMTC of 5G communication are applied will be described.

Description will focus on parts in the steps of FIG. 3 which are changed according to application of mMTC.

In step S1 of FIG. 3, the autonomous vehicle receives a UL grant from the 5G network in order to transmit specific information to the 5G network. Here, the UL grant may include information on the number of repetitions of transmission of the specific information and the specific information may be repeatedly transmitted on the basis of the information on the number of repetitions. That is, the autonomous vehicle transmits the specific information to the 5G network on the basis of the UL grant. Repetitive transmission of the specific information may be performed through frequency hopping, the first transmission of the specific information may be performed in a first frequency resource, and the second transmission of the specific information may be performed in a second frequency resource. The specific information can be transmitted through a narrowband of 6 resource blocks (RBs) or 1 RB.

The above-described 5G communication technology can be combined with methods proposed in the present invention which will be described later and applied or can complement the methods proposed in the present invention to make technical features of the methods concrete and clear.

Figure 4:
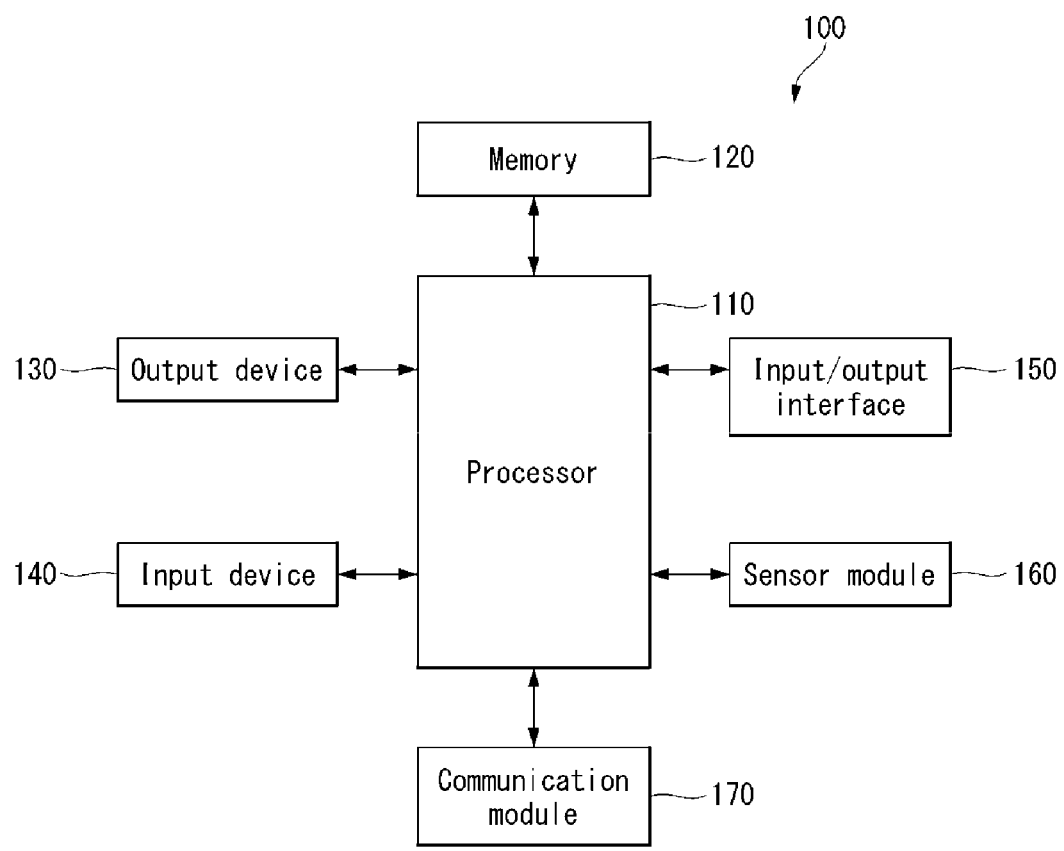
FIG. 4 illustrates a block diagram of an electronic device.

FIG. 4 illustrates a block diagram of an electronic device.

Referring to FIG. 4, an electronic device 100 may include at least one processor 110, a memory 120, an output device 130, an input device 140, an input/output interface 150, a sensor module 160, and a communication module 170.

The processor 110 may include at least one application processor (AP), at least one communication processor (CP), or at least one artificial intelligence (AI) processor. The application processor, the communication processor, or the AI processor may be respectively included in different integrated circuit (IC) packages, or may be included in one IC package.

The application processor may control a plurality of hardware or software components connected to the application processor by running an operating system or an application program, and perform various data processing/operation including multimedia data. For example, the application processor may be implemented as a system on chip (SoC). The processor 110 may further include a graphic processing unit (GPU) (not shown).

The communication processor may perform functions of managing a data link and converting a communication protocol in communication between the electronic device 100 and other electronic devices connected via a network. For example, the communication processor may be implemented as the SoC. The communication processor may perform at least a portion of a multimedia control function.

In addition, the communication processor may control data transmission and reception of the communication module 170. The communication processor may be implemented to be included as at least a part of the application processor.

The application processor or the communication processor may load, on a volatile memory, and process a command or data that is received from at least one of a non-volatile memory or other components connected to each of the application processor and the communication processor. Further, the application processor or the communication processor may store data, that is received from at least one of other components or generated by at least one of the other components, in the non-volatile memory.

The memory 120 may include an internal memory or an external memory. The internal memory may include at least one of a volatile memory (e.g., dynamic RAM (DRAM), static RAM (SRAM), synchronous dynamic RAM (SDRAM), etc.) or a non-volatile memory (e.g., one time programmable ROM (OTPROM), programmable ROM (PROM), erasable and programmable ROM (EPROM), electrically erasable and programmable ROM (EEPROM), mask ROM, flash ROM, NAND flash memory, NOR flash memory, etc.). According to an embodiment, the internal memory may take the form of a solid state drive (SSD). The external memory may include flash drive, for example, compact flash (CF), secure digital (SD), micro secure digital (Micro-SD), mini secure digital (Mini-SD), extreme digital (xD) or a memory stick, etc.

The output device 130 may include at least one of a display module or a speaker. The output device 130 may display various types of data including multimedia data, text data, voice data, etc. to a user or output the data as sound.

The input device 140 may include a touch panel, a digital pen sensor, a key, or an ultrasonic input device, etc. For example, the input device 140 may be the input/output interface 150. The touch panel may recognize a touch input in at least one of capacitive, pressure-sensitive, infrared, or ultrasonic types. In addition, the touch panel may further include a controller (not shown). In case of a capacitive touch panel, not only direct touch but also proximity recognition is possible. The touch panel may further include a tactile layer. In this case, the touch panel may provide a tactile reaction to the user.

The digital pen sensor may be implemented using the same or similar method to receiving a user's touch input or a separate recognition layer. The key may use a keypad or a touch key. The ultrasonic input device is a device that can confirm data by detecting a micro-sonic wave at a user equipment (UE) through a pen generating an ultrasonic signal, and is capable of wireless recognition. The electronic device 100 may also receive a user input from an external device (e.g., network, computer, or server) connected to the communication module 170 using the communication module 170.

The input device 140 may further include a camera module and a microphone. The camera module is a device capable of taking images and videos, and may include one or more image sensors, an image signal processor (ISP), or a flash LED. The microphone may receive a voice signal and convert it into an electrical signal.

The input/output interface 150 may transmit a command or data, that is input from the user through the input device or the output device, to the processor 110, the memory 120, the communication module 170, etc. through a bus (not shown). For example, the input/output interface 150 may provide the processor 110 with data for a user's touch input that is input through the touch panel. For example, the input/output interface 150 may output a command or data, that is received from the processor 110, the memory 120, the communication module 170, etc. through the bus, through the output device 130. For example, the input/output interface 150 may output voice data processed by the processor 110 to the user through the speaker.

The sensor module 160 may include at least one of a gesture sensor, a gyro sensor, an atmospheric pressure sensor, a magnetic sensor, an acceleration sensor, a grip sensor, a proximity sensor, an RGB (red, green, blue) sensor, a biometric sensor, a temperature/humidity sensor, an illuminance sensor, or an ultraviolet (UV) sensor. The sensor module 160 may measure physical quantity or sense an operating state of the electronic device 100 to convert measured or sensed information into electrical signals. Additionally or alternatively, the sensor module 160 may include an E-nose sensor, an electromyography (EMG) sensor, an electroencephalogram (EEG) sensor (not shown), an electrocardiogram (ECG) sensor, a photoplethysmography (PPG) sensor, a heart rate monitor (HRM) sensor, a perspiration sensor, a fingerprint sensor, or the like. The sensor module 160 may further include a control circuit for controlling at least one sensor included therein.

The communication module 170 may include a wireless communication module or an RF module. The wireless communication module may include, for example, Wi-Fi, BT, GPS or NFC. For example, the wireless communication module may provide a wireless communication function using a radio frequency. Additionally or alternatively, the wireless communication module may include a network interface or a modem, etc. for connecting the electronic device 100 to a network (e.g., Internet, LAN, WAN, telecommunication network, cellular network, satellite network, POTS or 5G network, etc.).

The RF module may be responsible for transmitting and receiving data, for example, transmitting and receiving an RF signal or a called electronic signal. For example, the RF module may include a transceiver, a power amp module (PAM), a frequency filter, or a low noise amplifier (LNA), etc. Further, the RF module may further include components, for example, conductors or lead wires, etc. for transmitting and receiving electromagnetic waves in a free space in wireless communication.

The electronic device 100 according to various embodiments of the present disclosure may include at least one of a server, a TV, a refrigerator, an oven, a clothing styler, a robot cleaner, a drone, an air conditioner, an air cleaner, a PC, a speaker, a home CCTV, an electric light, a washing machine, and a smart plug. Since the components of the electronic device 100 illustrated in FIG. 4 are exemplified as components generally provided in an electronic device, the electronic device 100 according to the embodiment of the present disclosure is not limited to the above-described components, and the components may be omitted and/or added, if necessary or desired.

Figure 5:
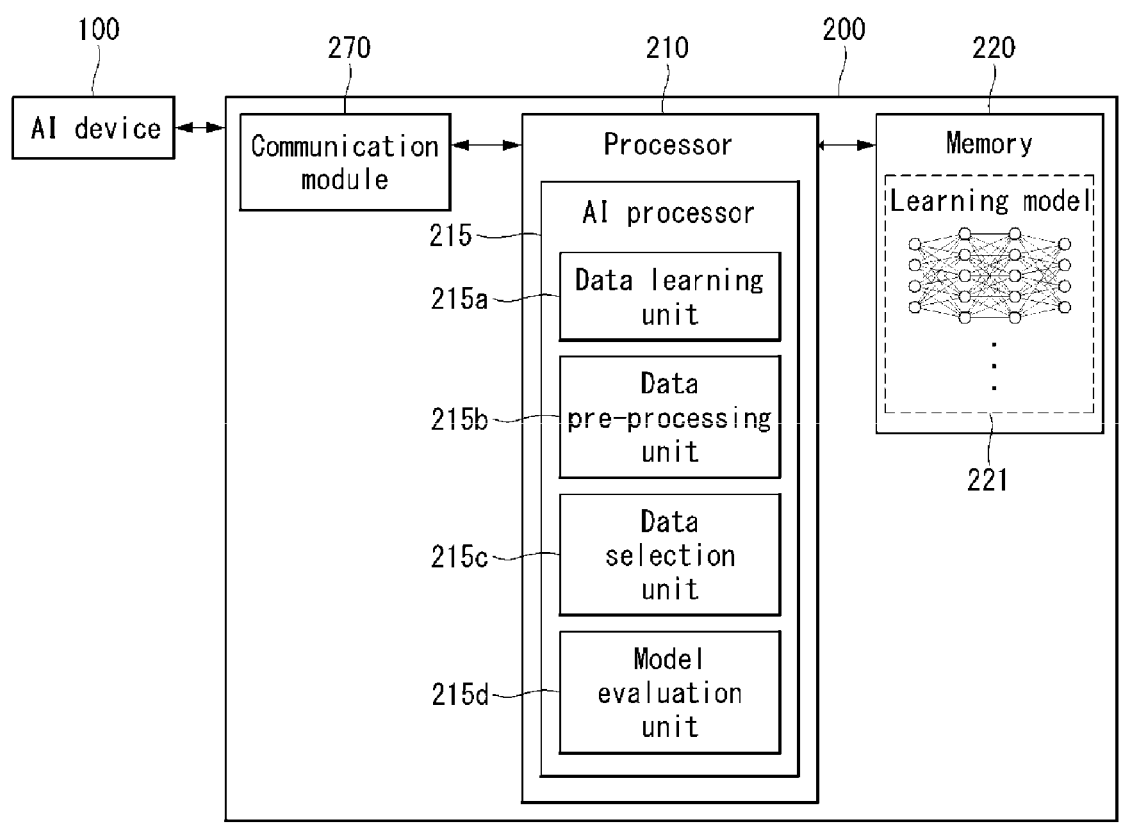
FIG. 5 illustrates a schematic block diagram of an AI server according to an embodiment of the present disclosure.

The electronic device 100 may perform an artificial intelligence-based control operation by receiving a result of AI processing from a cloud environment illustrated in FIG. 5, or may perform AI processing in an on-device manner by including an AI module in which components related to an AI process are integrated into one module.

An AI process performed in a device environment and/or a cloud environment or a server environment is described below with reference to FIGS. 5 and 6. FIG. 5 illustrates an example in which receiving data or signals may be performed in the electronic device 100, but AI processing for processing the input data or signals is performed in the cloud environment. In contrast, FIG. 6 illustrates an example of on-device processing in which the overall operation of AI processing for input data or signals is performed in the electronic device 100.

Figure 6:
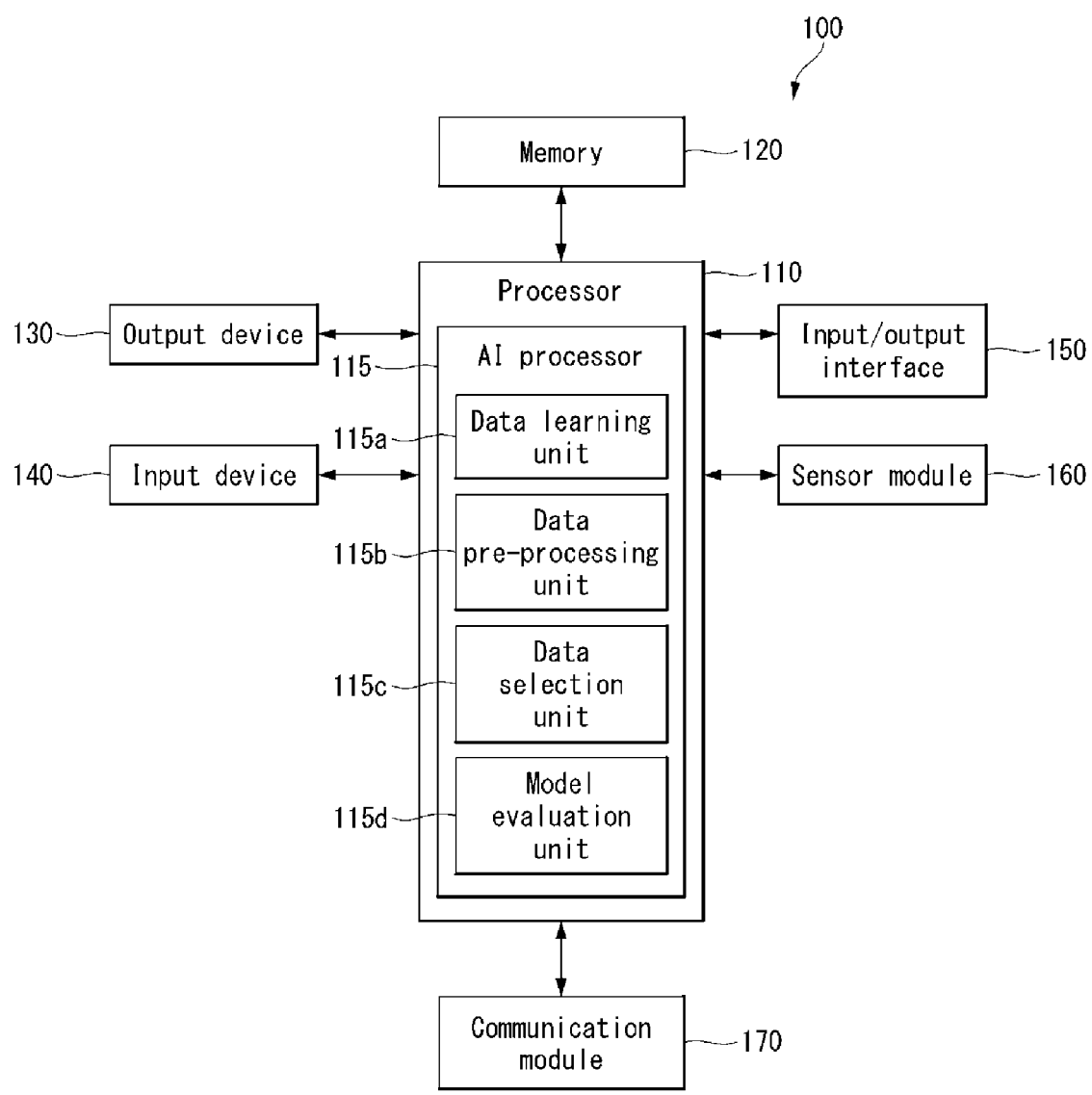
FIG. 6 illustrates a schematic block diagram of an AI device according to another embodiment of the present disclosure.

In FIGS. 5 and 6, the device environment may be referred to as a 'client device' or an 'AI device', and the cloud environment may be referred to as a 'server'.

FIG. 5 illustrates a schematic block diagram of an AI server according to an embodiment of the present disclosure.

A server 200 may include a processor 210, a memory 220, and a communication module 270.

An AI processor 215 may learn a neural network using a program stored in the memory 220. In particular, the AI processor 215 may learn the neural network for recognizing data related to an operation of an AI device 100. Here, the neural network may be designed to simulate the human brain structure (e.g., the neuronal structure of the human neural network) on a computer. The neural network may include an input layer, an output layer, and at least one hidden layer. Each layer may include at least one neuron with a weight, and the neural network may include a synapse connecting neurons and neurons. In the neural network, each neuron may output an input signal input through the synapse as a function value of an activation function for weight and/or bias.

A plurality of network modes may exchange data according to each connection relationship so that neurons simulate synaptic activity of neurons that exchange signals through the synapses. Here, the neural network may include a deep learning model developed from a neural network model. In the deep learning model, a plurality of network nodes are located on different layers and may exchange data according to a convolution connection relationship. Examples of the neural network model may include various deep learning techniques such as a deep neural network (DNN), a convolutional neural network (CNN), a recurrent neural network, a restricted Boltzmann machine, a deep belief network, and a deep Q-Network, and may be applied in fields such as vision recognition, voice recognition, natural language processing, and voice/signal processing.

The processor 210 performing the functions described above may be a general-purpose processor (e.g., a CPU), but may be a dedicated AI processor (e.g., a GPU) for AI learning.

The memory 220 may store various programs and data necessary for the operation of the AI device 100 and/or the server 200. The memory 220 may be accessed by the AI processor 215, and may read/write/modify/delete/update data by the AI processor 215. In addition, the memory 220 may store a neural network model (e.g., the deep learning model) generated through a learning algorithm for data classification/recognition according to an embodiment of the present disclosure. Furthermore, the memory 220 may store not only a learning model 221 but also input data, training data, and learning history, etc.

The AI processor 215 may include a data learning unit 215a for learning a neural network for data classification/recognition. The data learning unit 215a may learn criteria regarding what training data to use to determine data classification/recognition, and how to classify and recognize the data using the training data. The data learning unit 215a may learn the deep learning model by acquiring training data to be used for learning and applying the acquired training data to the deep learning model.

The data learning unit 215a may be manufactured in a form of at least one hardware chip and may be mounted on the server 200. For example, the data learning unit 215a may be manufactured in a form of a dedicated hardware chip for artificial intelligence, or may be manufactured as part of a general-purpose processor (CPU) or a dedicated graphics processor (GPU) and mounted on the server 200. In addition, the data learning unit 215a may be implemented as a software module. When the data learning unit 215a is implemented as the software module (or a program module including instructions), the software module may be stored in a non-transitory computer readable media. In this case, at least one software module may be provided to an operating system (OS), or may be provided by an application.

The data learning unit 215a may learn the neural network model to have criteria for determining how to classify/recognize preset data using the acquired training data. In this instance, a learning method by a model learning unit may be classified into supervised learning, unsupervised learning, and reinforcement learning. Here, the supervised learning may refer to a method of learning an artificial neural network in a state where a label for training data is given, and the label may mean a correct answer (or a result value) that the artificial neural network has to infer when the training data is input to the artificial neural network. The unsupervised learning may mean a method of learning an artificial neural network in a state where the label for training data is not given. The reinforcement learning may mean a method in which an agent defined in a specific environment is learned to select an action or a sequence of actions that maximize cumulative rewards in each state. Further, the model learning unit may learn the neural network model using a learning algorithm including an error backpropagation method or a gradient decent method. When the neural network model is learned, the learned neural network model may be referred to as the learning model 221. The learning model 221 is stored in the memory 220 and may be used to infer a result for new input data rather than the training data.

The AI processor 215 may further include a data pre-processing unit 215b and/or a data selection unit 215c, in order to improve analysis results using the learning model 221 or to save resources or time required to generate the learning model 221.

The data pre-processing unit 215b may pre-process the acquired data so that the acquired data can be used for learning/inference for determining a situation. For example, the data pre-processing unit 215b may extract feature information as pre-processing for input data acquired through the input device, and the feature information may be extracted in a format such as a feature vector, a feature point, or a feature map.

The data selection unit 215c may select data necessary for learning among training data or training data pre-processed by the pre-processing unit. The selected training data may be provided to the model learn unit. For example, the data selection unit 215c may select only data for an object included in a specific region as training data by detecting the specific region among images acquired through a camera of the electronic device. Further, the selection unit 215c may select data necessary for inference among input data acquired through the input device or input data pre-processed by the pre-processing unit.

The AI processor 215 may further include a model evaluation unit 215d to improve the analysis results of the neural network model. The model evaluation unit 215d may input evaluation data into the neural network model and may allow the model learning unit to learn again when an analysis result output from the evaluation data does not satisfy a predetermined criterion. In this case, the evaluation data may be preset data for evaluating the learning model 221. For example, among the analysis results of the learned neural network model for the evaluation data, when the number or ratio of evaluation data whose analysis results are not accurate exceeds a preset threshold, the model evaluation unit 215d may evaluate that a predetermined criterion are not satisfied.

The communication module 270 may send a result of AI processing by the AI processor 215 to an external electronic device.

As described above, FIG. 5 illustrates that the AI process is implemented in the cloud environment due to computing operation, storage, and power constraints, by way of example, but the present disclosure is not limited thereto. For example, the AI processor 215 may be implemented by being included in a client device. FIG. 6 is an example in which AI processing is implemented in the client device, and is substantially the same as that illustrated in FIG. 5 except that the AI processor 215 is included in the client device.

FIG. 6 illustrates a schematic block diagram of an AI device according to another embodiment of the present disclosure.

The function of each configuration illustrated in FIG. 6 may refer to FIG. 5. However, since the AI processor is included in a client device 100, it may not be necessary to communicate with the server 200 (see FIG. 5) in performing a process such as data classification/recognition, etc., and hence an immediate or real-time data classification/recognition operation is possible. Further, since it is not necessary to send personal information of the user to the server 200 (see FIG. 5), it is possible to classify/recognize data for the purpose without leaking the personal information.

The respective components illustrated in FIGS. 5 and 6 indicate functional elements that are divided functionally, and it is noted that at least one component can be implemented in a form (e.g., AI module) integrated with each other in a real physical environment. It goes without saying that components that are not disclosed may be included or omitted, in addition to the plurality of components illustrated in FIGS. 5 and 6.

Figure 7:
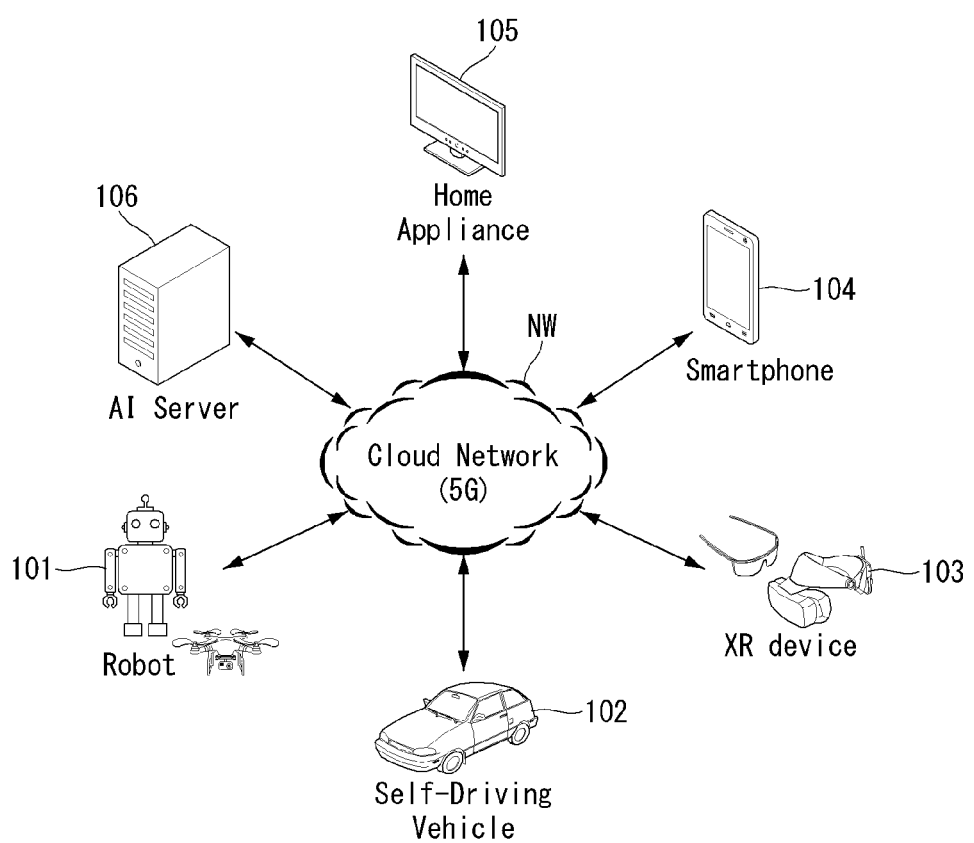
FIG. 7 is a conceptual diagram of an AI device according to an embodiment of the present disclosure.

FIG. 7 is a conceptual diagram of an AI device according to an embodiment of the present disclosure.

Referring to FIG. 7, in an AI system 1, at least one of an AI server 106, a robot 101, an autonomous vehicle 102, an XR device 103, a smartphone 104, or a home appliance 105 is connected to a cloud network NW. The robot 101, the autonomous vehicle 102, the XR device 103, the smartphone 104, or the home appliance 105 applied with the AI technology may be referred to as the AI devices 101 to 105.

The cloud network NW may mean a network that forms a part of a cloud computing infrastructure or exists in the cloud computing infrastructure. The cloud network NW may be configured using the 3G network, the 4G or Long Term Evolution (LTE) network, or the 5G network.

That is, the respective devices 101 to 106 constituting the AI system 1 may be connected to each other via the cloud network NW. In particular, the respective devices 101 to 106 may communicate with each other through a base station, but may directly communicate with each other without going through the base station.

The AI server 106 may include a server performing AI processing and a server performing operations on big data.

The AI server 106 may be connected to at least one of the robot 101, the autonomous vehicle 102, the XR device 103, the smartphone 104, or the home appliance 105, which are AI devices constituting the AI system, via the cloud network NW, and may assist at least a part of the AI processing of the connected AI devices 101 to 105.

In this instance, the AI server 106 may learn the artificial neural network according to a machine learning algorithm instead of the AI devices 101 to 105, and directly store the learning model or send it to the AI devices 101 to 105.

In this instance, the AI server 106 may receive input data from the AI devices 101 to 105, infer a result value for the received input data using the learning model, generate a response or a control command based on the inferred result value, and transmit it to the AI devices 101 to 105.

Alternatively, the AI devices 101 to 105 may infer the result value for the input data directly using the learning model and generate a response or a control command based on the inferred result value.

Figure 8:
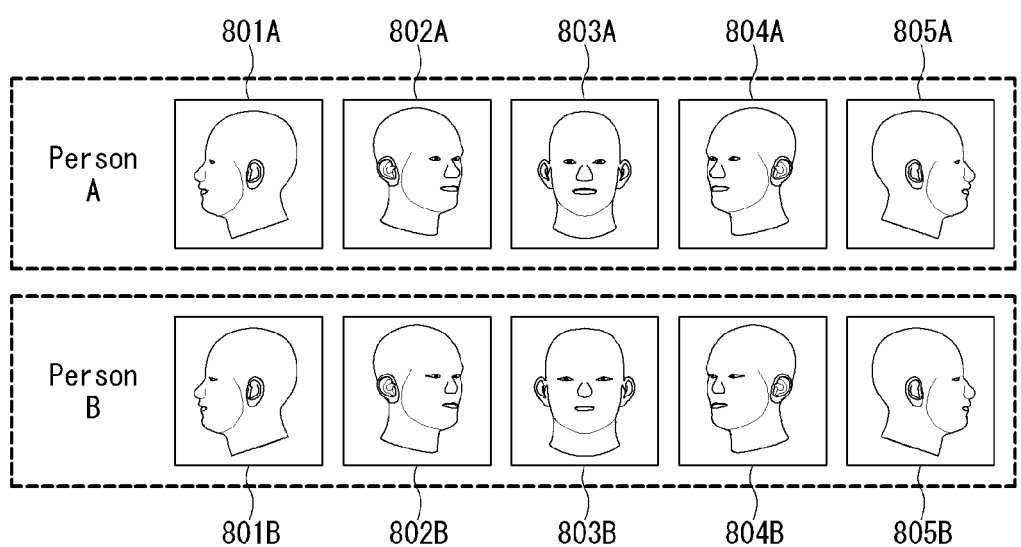
FIG. 8 is a diagram for describing a user authentication method according to an embodiment of the present disclosure.

FIG. 8 is a diagram for describing a user authentication method according to an embodiment of the present disclosure.

Referring to FIG. 8, the AI device 100 may perform a user authentication process based on an image including a person. More specifically, the AI device 100 may extract a face image of a person from an image including the person, and may perform user authentication based on the extracted face image. The face image may include an image of an area corresponding to the face in the body of the person. The AI device 100 may extract the face image by detecting a portion corresponding to the face in the body of the person. The face in the body of the person may include an eye, a nose, an eyebrow, a jaw, an ear, etc. The AI device 100 may extract the face image by recognizing a portion indicative of the face.

When the face image is extracted, the AI device 100 may perform user authentication based on feature information of the extracted face image. The feature information of the face image may be represented as a feature value or a feature vector. The AI device 100 may use a neural network model based on a CNN in order to extract the feature information of the face image, but the present disclosure is not limited thereto.

The AI device 100 may generate an output for the user authentication by applying, as an input, the extracted feature information to a learning model for performing the user authentication. For example, the AI device 100 may analyze the output for the user authentication, may determine the user as a registered user when an output equal to or greater than a preset threshold value is checked, and may determine the user as an unregistered user when an output less than the preset threshold value is checked.

In performing the user authentication based on the face image, the AI device 100 may identify any one of a plurality of persons, but the accuracy of the user authentication in distinguishing between two or more persons who look like each other may be problematic. More specifically, obtained face images of different persons may have similar features. For example, a user authentication of a first person (person A) and a second person (person B) having similar appearances is described. In the present disclosure related to FIG. 8 hereinafter, the person A is denoted as the first person, and the person B is denoted as the second person.

Referring to FIG. 8, the first person and the second person may have different appearances depending on a direction and/or an angle. For example, the first person may have face appearances of left 90 degrees, left 45 degrees, a front, right 45 degrees, and right 90 degrees. The second person may also have face appearances of left 90 degrees, left 45 degrees, a front, right 45 degrees, and right 90 degrees, but the present disclosure is not limited thereto. Appearances of the first person and the second person based on various directions and/or angles have different features depending on portions of their faces. Accordingly, the AI device 100 may easily distinguish between the first and second persons based on a front image of the first person and a front image of the second person. However, in the case of the face images of the left or right 90 degrees, the AI device 100 may have a difficulty in distinguishing between the first person and the second person because each portion of a different face is not clearly shown.

Figure 9:
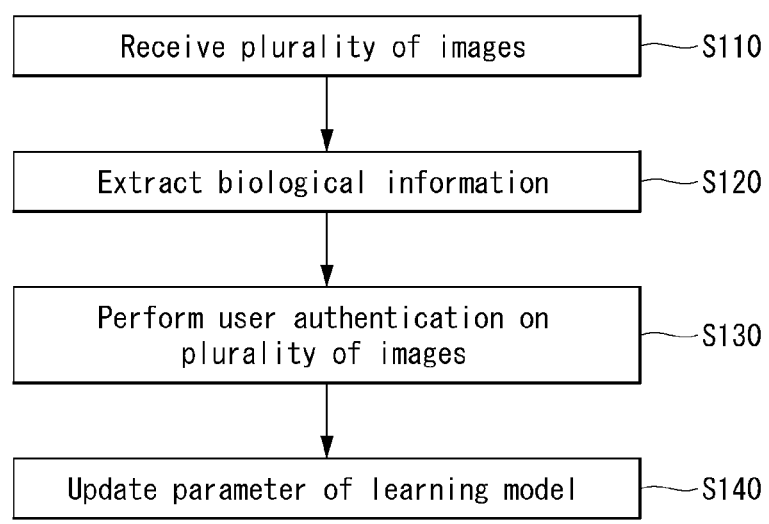
FIG. 9 is a flowchart for describing a user authentication method according to an embodiment of the present disclosure.
Figure 10:
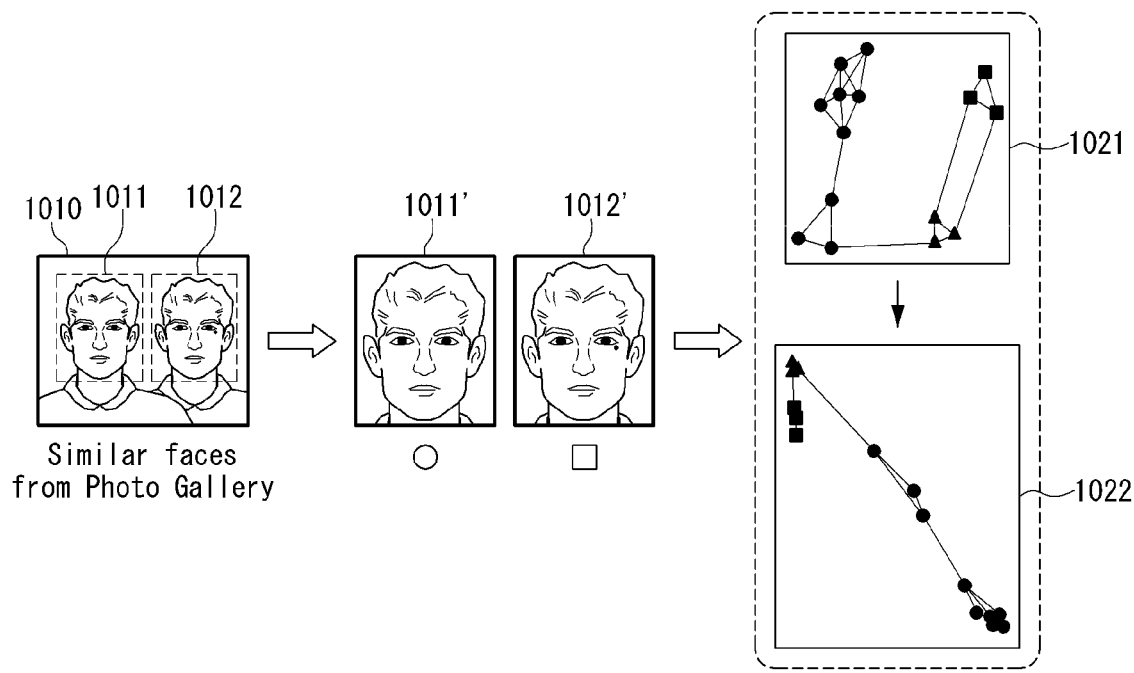
FIGS. 10 to 12 are diagrams for describing various implementation examples of a user authentication method according to an embodiment of the present disclosure.
Figure 11:
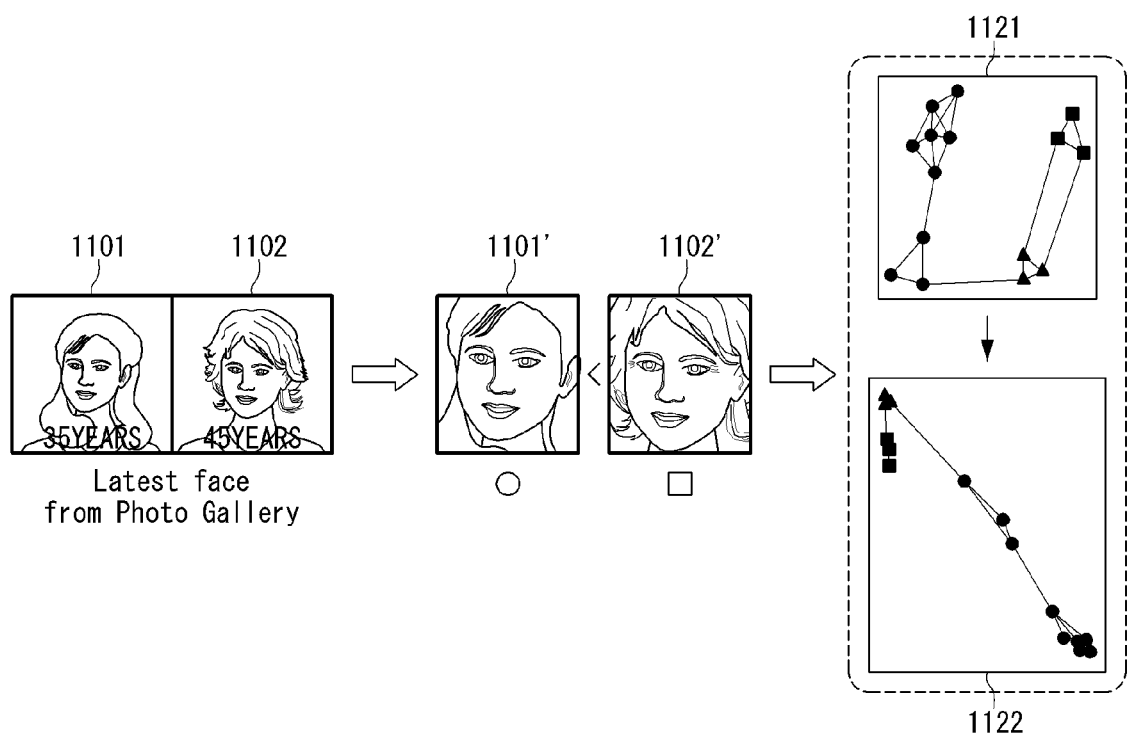
Figure 12:
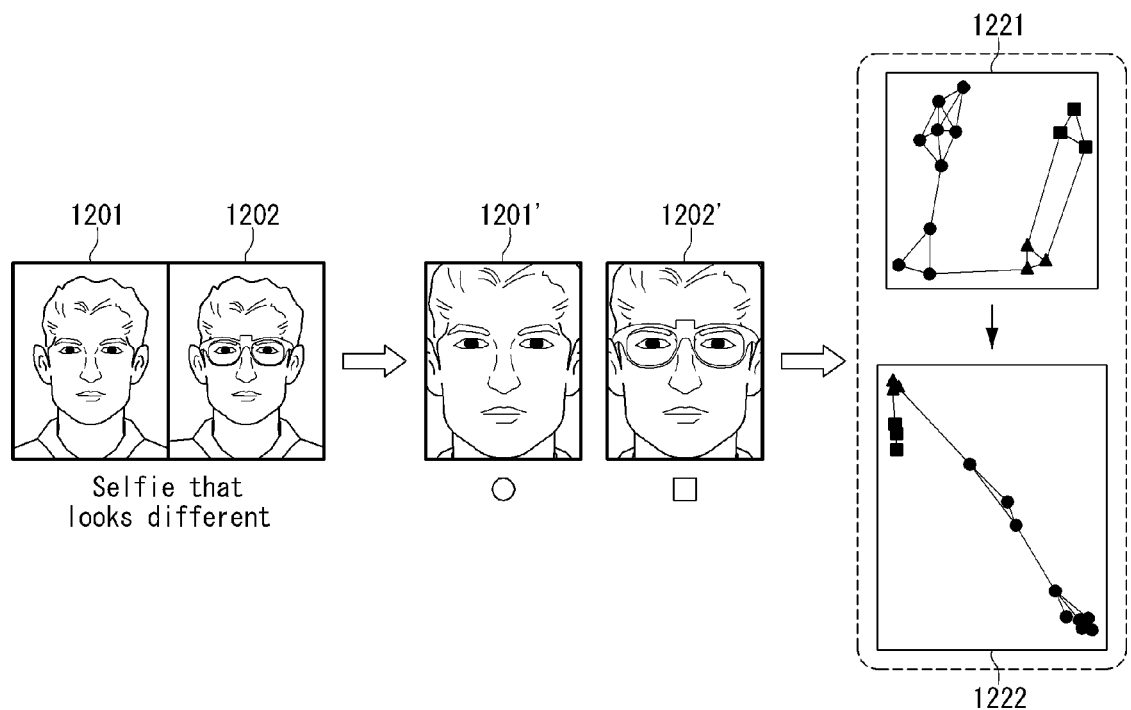

FIG. 9 is a flowchart for describing a user authentication method according to an embodiment of the present disclosure. FIGS. 10 to 12 are diagrams for describing various implementation examples of a user authentication method according to an embodiment of the present disclosure. Hereinafter, in the present disclosure, AI processing of a mobile terminal is illustrated, but the present disclosure is not limited thereto. The same process may be performed even in various computing devices related to image processing or user authentication.

Referring to FIG. 9, the processor 110 may receive a plurality of images including at least one object (S110). The at least one object may include a person, an animal or the background, but is not limited thereto. The object according to an embodiment of the present disclosure may include a person or the face of the person. The plurality of images may include an image obtained by the camera of the AI device and stored in the memory, an image already stored in the memory, or an image received from an external terminal (e.g., the AI system 1 or the AI server 200) capable of communication over a network. The plurality of images obtained as described above may be subsequently used for the training of a learning model as learning data.

The processor 110 may extract biological information from the plurality of images (S120). The biological information may include feature information of a face or an embedding vector generated from the feature information of the face. The feature information of the face may include one or two or more of the location of an eye, an eyebrow location, an eyebrow shape, lips, a jawline, a philtrum, mustache and/or beard, a mole, or a scar, but is not limited thereto. The embedding vector may be extracted from the feature information by the processor 110. For example, the processor 110 may extract the embedding vector using a feature extraction module. The feature extraction module may be a model based on a neural network. In this case, the neural network may be a convolutional neural network. The embedding vector may indicate, as a multi-dimensional vector, a geometric relation between feature information of a face included in an image and the feature information. The processor 110 according to an embodiment of the present disclosure may perform pre-processing on the plurality of images prior to the extraction of the biological information. For example, only a face area may be extracted from the plurality of images including the face of the user. For example, a bounding box corresponding to the face area may be cut. If user authentication is performed using an image pre-processed as described above, the consumption of resources and/or a learning time can be efficiently managed.

The processor 110 may perform user authentication based on a difference between the extracted biological information and biological information of a user stored in the memory (S130). In this case, the AI device may set the extracted biological information as an input to a previously trained learning model, and may perform the user authentication based on the output of the learning model. In this case, the learning model for the user authentication is a neural network-based learning model previously trained by setting biological information of a registered user as an answer label. The learning model may be configured as a neural network model based on a graphic convolutional network (GCN), but is not limited thereto. The user authentication may be performed based on a vector distance between the extracted biological information and the biological information of the user stored in the memory. The biological information of the user may be stored in the memory of an AI device or may be received from an external terminal capable of communicating with an AI device over a network. The AI device according to an example may determine a user as a registered user when the vector distance between the extracted biological information and biological information of the user stored in the memory is a preset threshold value or less, and may determine the user as an unregistered user when the vector distance exceeds the preset threshold value.

If a result of the execution of the user authentication satisfies a preset condition, the processor 110 may update a parameter of the learning model for performing the user authentication (S140). A feature vector indicative of the biological information may have a different value depending on an environment (e.g., lighting, an angle, or an expression) around a person although an image is an image of the same person. For example, as in the example of FIG. 8, the same person may be determined as a different person due to a different angle. In order to improve the ability to identify the same person and the ability to distinguish between similar persons regardless of surrounding environments as described above, the AI device may adjust a parameter of the learning model.

The processor 110 may change a weight or bias of the learning model so that a distance between feature vectors of the same person determined as a different person is adjusted to become closer or a distance between feature vectors of a different person determined as the same person is adjusted to become farther. In order to change the weight or the bias, learning data for the update of the learning model may need to be generated. The learning data for the update of the learning model may be differently labeled depending on various conditions.

The preset condition may include a first condition to a third condition. More specifically, the preset condition may include a first condition in which if two or more objects authenticated as a user are present within one image, a selection input for any one of the two or more objects is requested, a second condition in which two or more images including an object authenticated as a user are present and generation times of the two or more images must be different, or a third condition in which an image captured through the front camera of an AI device (e.g., a smartphone) needs to not include an object authenticated as a user.

If the first condition is satisfied, the processor 110 may adjust the weight or bias of the learning model so that reliability of the object for which the selection input is received has a higher value. If the second condition is satisfied, the processor 110 may adjust the weight or bias of the learning model so that reliability of an object included in the most recently generated image among the two or more images has a higher value. If the third condition is satisfied, the processor 110 may adjust the weight or bias of the learning model so that reliability of an object included in an image not including an object authenticated as a user has a higher value. As described above, the user authentication method according to an embodiment of the present disclosure can improve performance of a learning model by updating a parameter of the learning model in response to various preset conditions.

FIG. 10 is a diagram illustrating the case of the first condition. Referring to FIG. 10, an image 1010 may include two or more persons having similar appearances. For example, a first person 1011 and a second person 1012 included in the image 1010 illustrated in FIG. 10 are similar in a form or shape of at least one feature portion (e.g., an eyebrow, an iris, a jawline, lips or a nose) that forms the face of each person. Accordingly, some of various learning models for user authentication may determine the first person 1011 and the second person 1012 as the same person without distinguishing between the first person 1011 and the second person 1012.

In the user authentication method for user authentication according to an embodiment of the present disclosure, a parameter of a learning model may be updated to distinguish between the first person 1011 and the second person 1012 having similar appearances. Specifically, the processor 110 may extract face images of the first person 1011 and second person 1012 included in the image 1010 using an authentication model for the authentication of a user or an extraction model for extracting a face image of a person. In this case, the face of the first person 1011 may be defined as a first face image 1011', and the face of the second person 1012 may be defined as a second face image 1012'. In this case, the processor 110 may not distinguish between the first person 1011 and the second person 1012 although it compares the first face image 1011' and the second face image 1012' using the authentication model. In such a case, a mobile terminal may receive a touch input to the display from a user, and may select any one of the first person 1011 or the second person 1012 in response to the touch input. As described above, since a person to which the touch input of a user has been applied may be considered as an actual user among two or more persons, the mobile terminal may adjust a parameter of the learning model so that reliability of the selected person has a higher value. In this case, the processor 110 may adjust a weight or bias of the learning model based on a graph convolutional network (GCN) so that the distance between different persons in a graph is increased. As a result, it can be seen that a distance between a circle symbol and a square symbol in a second graph 1022 is further increased compared to a distance between a circle symbol related to the first face image 1011' and a square symbol related to the second face image 1012' in a first graph 1021 before the parameter is adjusted. Furthermore, it may be seen that as the results of training based on the GCN, symbols related to a plurality of persons are further closed. As described above, the learning model trained based on the GCN can improve performance for distinguishing between similar persons by controlling a distance in a graph to be further increased even in the case of similar persons.

FIG. 11 is a diagram illustrating the case of the second condition, and a description of contents redundant with those of FIG. 10 is omitted. Referring to FIG. 11, two or more images 1101 and 1102 among a plurality of images stored in the memory 120 may have a difference between their generation times. The processor 110 may collect the two or more images 1101 and 1102 having a difference between their generation times, which is a reference time or more. The reference time may be set on a yearly basis, a monthly basis, a daily basis, or a combined basis of year/month/day. For example, the processor 110 may collect the first image 1101 generated at first timing and the second image 1102 generated at second timing after the reference time (e.g., 10 years) from the first timing. The processor 110 may extract a first face image 1101' from the first image 1101 and extract a second face image 1102' from the second image 1102. The face of a registered user is closer to the second face image 1102' generated at later timing over aging. Accordingly, a learning model for user authentication is trained to learn the second face image 1102' as an answer, and needs to generate a classification result that classifies the first face image 1101' to be not the registered user. Accordingly, the processor 110 may adjust a weight or bias of the learning model so that reliability of the second face image 1102' generated at later timing and having a higher value is output. As in FIG. 10, in FIG. 11, as a result of the adjustment of the parameter, a first graph 1121 may be changed into a second graph 1122. A circle symbol is related to the first face image 1101', and a square symbol is related to the second face image 1102'.

FIG. 12 is a diagram illustrating the case of the third condition. Referring to FIG. 12, two or more images 1201 and 1202 among a plurality of images stored in the memory may be selfie images of the same person. Although user authentication is performed on the two or more selfie images of the same person, persons corresponding to the two or more selfie images may be determined as persons who are not the same person. As described above, the same person may be determined as a different person based on a difference between their appearances or an environment difference. Specifically, the processor 110 may collect a selfie image among a plurality of images stored in the memory. The selfie image denotes an image captured by a front camera located on the same surface as the display of a mobile terminal. In an embodiment, when an input to capture an image is received through the front camera of the mobile terminal, an image may be generated in response to the input, and a tag indicative of a selfie image may be assigned to the image. The processor 110 may identify the selfie image among a plurality of images based on the tag indicative of the selfie image. As described above, the processor 110 may collect a selfie image among a plurality of images, and may perform a subsequent process of updating a parameter of a learning model using the plurality of images. More specifically, although user authentication using a learning model is performed on a selfie image, if it is determined that the selfie image does not include a person authenticated as a registered user, the processor 110 may update a parameter of the learning model so that a person included in the selfie image is determined as the registered user. For example, the processor 110 may collect the first selfie image 1201 and the second selfie image 1202 among a plurality of images stored in the memory. The processor 110 may extract a first face image 1201' included in the first selfie image 1201 and a second face image 1202' included in the second selfie image 1202, and may perform user authentication on the first face image 1201' and the second face image 1202'. In this case, unlike in the first selfie image 1201, a person included in the second selfie image 1202 wears glasses. In such a case, the learning model may fail in the user authentication. Although a tag to identify a selfie image has been assigned, if a corresponding person is determined as an unregistered user as a result of AI processing, the processor 110 may adjust a weight or bias of a learning model so that an input image when the corresponding person is determined as an unregistered user is determined as a registered user. As a result of the adjustment of the weight or the bias, the processor 110 may adjust the bias or weight of the learning model so that both the first face image 1201' and the second face image 1202' are determined as registered users. Accordingly, as described with reference to FIGS. 10 and 11, a first graph 1221 may be changed into a second graph 1222.

In the present disclosure, user authentication in an on-device environment of the mobile terminal 100 and a process of updating a parameter of a learning model for the user authentication have been described, but an embodiment of the present disclosure is not limited to the on-device processing. User authentication in a cloud environment and a process of updating a parameter of a learning model for the user authentication are described with reference to FIG. 13.

Figure 13:
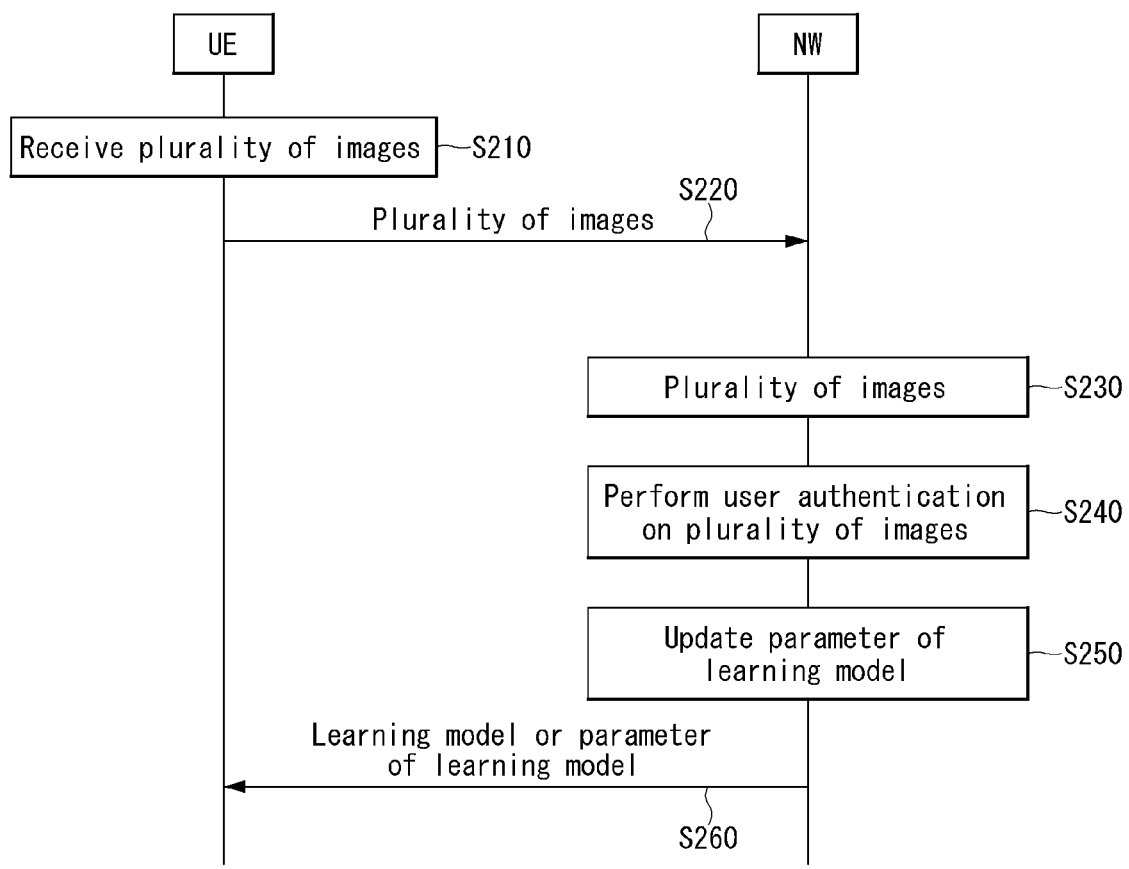
FIG. 13 is a sequence diagram for describing a user authentication method according to another embodiment of the present disclosure.

FIG. 13 is a sequence diagram for describing a user authentication method according to another embodiment of the present disclosure. Two or more steps illustrated in FIG. 13 may correspond to the detailed descriptions of two or more steps described with reference to FIG. 9, and thus a description of redundant contents thereof is omitted.

Referring to FIG. 13, a user equipment (UE) may control the transceiver to transmit a plurality of images or a feature extracted from the plurality of images to the AI system 1 included in a 5G network. Furthermore, the UE may control the transceiver to receive AI-processed information from the AI system 1.

The UE may control the transceiver to transmit a plurality of images or a feature, extracted from the plurality of images, to the AI system 1 included in a 5G network. Furthermore, the UE may control the transceiver to receive AI-processed information from the AI system 1. The UE may perform an initial access procedure with the 5G network in order to transmit the plurality of images to the 5G network. The UE may perform the initial access procedure with the 5G network based on an SSB. Furthermore, the UE may receive, from the network, DCI used to schedule the transmission of the plurality of images through the transceiver. The UE may transmit, to the 5G network, the plurality of images or a feature value extracted from the plurality of images based on the DCI. The plurality of images or the feature value extracted from the plurality of images is transmitted to the 5G network through a PUSCH. The DM-RSs of the SSB and the PUSCH may be QCLed with respect to a QCL type D.

Referring back to FIG. 13, a UE may receive a plurality of images including at least one object (S210). The UE may transmit the plurality of images to a network (NW) by controlling the communication module (S220). The processor of the AI system 1 may extract biological information from the plurality of images (S230). The processor of the AI system 1 may perform user authentication based on a difference between the extracted biological information and biological information of a user stored in the memory (S240). When a result of the execution of the user authentication satisfies a preset condition, the processor of the AI system 1 may update a parameter of a learning model for performing the user authentication (S250). The AI system may transmit, to the UE, the learning model for the user authentication or the parameter of the learning model by controlling the communication module (S260). S210, S230, S240, and S250 in FIG. 13 may correspond to S110, S120, S130, and S140 in FIG. 9, respectively.

Effects of the user authentication according to an embodiment of the present disclosure are described as follows.

The present disclosure can improve performance for distinguishing between similar persons.

Furthermore, the present disclosure can update a parameter of a learning model for user authentication adaptive to biological information of a user who is changed over aging.

Furthermore, the present disclosure can infer the same user authentication results for various appearances of the same person.

Effects which may be obtained in the present disclosure are not limited to the aforementioned effects, and other technical effects not described above may be evidently understood by a person having ordinary skill in the art to which the present disclosure pertains from the above description.

The present disclosure may be implemented as a computer-readable code in a medium in which a program is written. The computer-readable medium includes all types of recording devices in which data readable by a computer system is stored. Examples of the computer-readable medium include a hard disk drive (HDD), a solid state disk (SSD), a silicon disk drive (SDD), a ROM, a RAM, a CD-ROM, magnetic tapes, floppy disks, and optical data storages, and also include that the computer-readable medium is implemented in the form of carrier waves (e.g., transmission through the Internet). Accordingly, the detailed description should not be construed as being limitative from all aspects, but should be construed as being illustrative. The scope of the present disclosure should be determined by reasonable analysis of the attached claims, and all changes within the equivalent range of the present disclosure are included in the scope of the present disclosure.

What is claimed is:

1. A user authentication method comprising:
   receiving a plurality of images including at least one object;
   extracting biological information from the plurality of images;
   performing user authentication based on a difference between the extracted biological information and biological information of a user stored in a memory; and
   updating a parameter of a learning model for the user authentication when a result of the execution of the user authentication satisfies a preset condition,
   wherein the preset condition includes a third condition in which a first image captured through a front camera includes an object authenticated as the user and a second image captured through the front camera does not include the object authenticated as the user,
   wherein the updating the parameter of the learning model includes adjusting a weight or bias of the learning model so that reliability related to an object included in the second image as the user has a higher value, when the third condition is satisfied, and
   wherein the first image and the second image are tagged to identify a selfie image.

2. The user authentication method of claim 1,
   wherein the receiving the plurality of images includes receiving the plurality of images from an external terminal over a network.

3. The user authentication method of claim 1,
   wherein the receiving the plurality of images includes receiving an image obtained through a camera or an image stored in the memory.

4. The user authentication method of claim 1,
   wherein the biological information includes feature information of a face or an embedding vector generated from the feature information, and
   wherein the feature information includes a specific part of the face, including a location of an eye, an eyebrow location, an eyebrow shape, lips, a jawline, a philtrum, mustache and/or beard, a mole, or a scar.

5. The user authentication method of claim 1,
   wherein the performing the user authentication includes determining, as an identical person, the object included in the image when a vector distance between the extracted biological information and the biological information of the user is a reference value or less.

6. The user authentication method of claim 1,
   wherein the preset condition includes a first condition in which a selection input for any one of two or more objects is received if the two or more objects authenticated as the user are present within one image, and
   wherein the updating the parameter of the learning model includes adjusting a weight or bias of the learning model so that reliability related to the object for which the selection input is received indicates a higher value, when the first condition is satisfied.

7. The user authentication method of claim 1,
   wherein the preset condition includes a second condition in which two or more images including the object authenticated as the user are present and generation times of the two or more images are different, and
   wherein the updating the parameter of the learning model includes adjusting a weight or bias of the learning model so that reliability related to an object included in an image most recently generated among the two or more images indicates a higher value, when the second condition is satisfied.

8. The user authentication method of claim 1,
   wherein the learning model is a neural network model based on a graphic convolution network (GCN).

9. The user authentication method of claim 1, further comprising:
   receiving, from a network, downlink control information (DCI) used to schedule a transmission of the plurality of images; and
   transmitting the plurality of images to the network based on the DCI.

10. The user authentication method of claim 9, further comprising:
    performing an initial access procedure with the network based on a synchronization signal block (SSB); and
    transmitting a screenshot image to the network through a physical uplink shared channel (PUSCH),
    wherein demodulate reference signals (DM-RSs) of the SSB and the PUSCH are quasi co-located (QCLed) with respect to a quasi co location (QCL) type D.

11. The user authentication method of claim 10, further comprising:
    controlling a transceiver to transmit the plurality of images to an AI processor or an AI system included in the network; and
    controlling the transceiver to receive AI-processed information from the AI processor or the AI system,
    wherein the AI-processed information includes an updated parameter of the learning model for the user authentication.

12. A mobile terminal comprising:
    a memory storing registered user information and a plurality of images; and
    a processor configured to extract biological information from the plurality of images, perform user authentication based on a difference between the extracted biological information and biological information of a user stored in a memory, and update a parameter of a learning model for the user authentication when a result of the execution of the user authentication satisfies a preset condition,
    wherein the preset condition includes a third condition in which a first image captured through a front camera includes an object authenticated as the user and a second image captured through the front camera does not include the object authenticated as the user,
    wherein the updating the parameter of the learning model includes adjusting a weight or bias of the learning model so that reliability related to an object included in the second image as the user has a higher value, when the third condition is satisfied, and
    wherein the first image and the second image are tagged to identify a selfie image.

13. A non-transitory computer system-readable recording medium in which a program for executing the method according to claim 1, in a computer system has been written.

* * * * *